June 22, 1943. W. L. POLLARD 2,322,251
VARIABLE SPEED TRANSMISSION
Filed Sept. 15, 1941
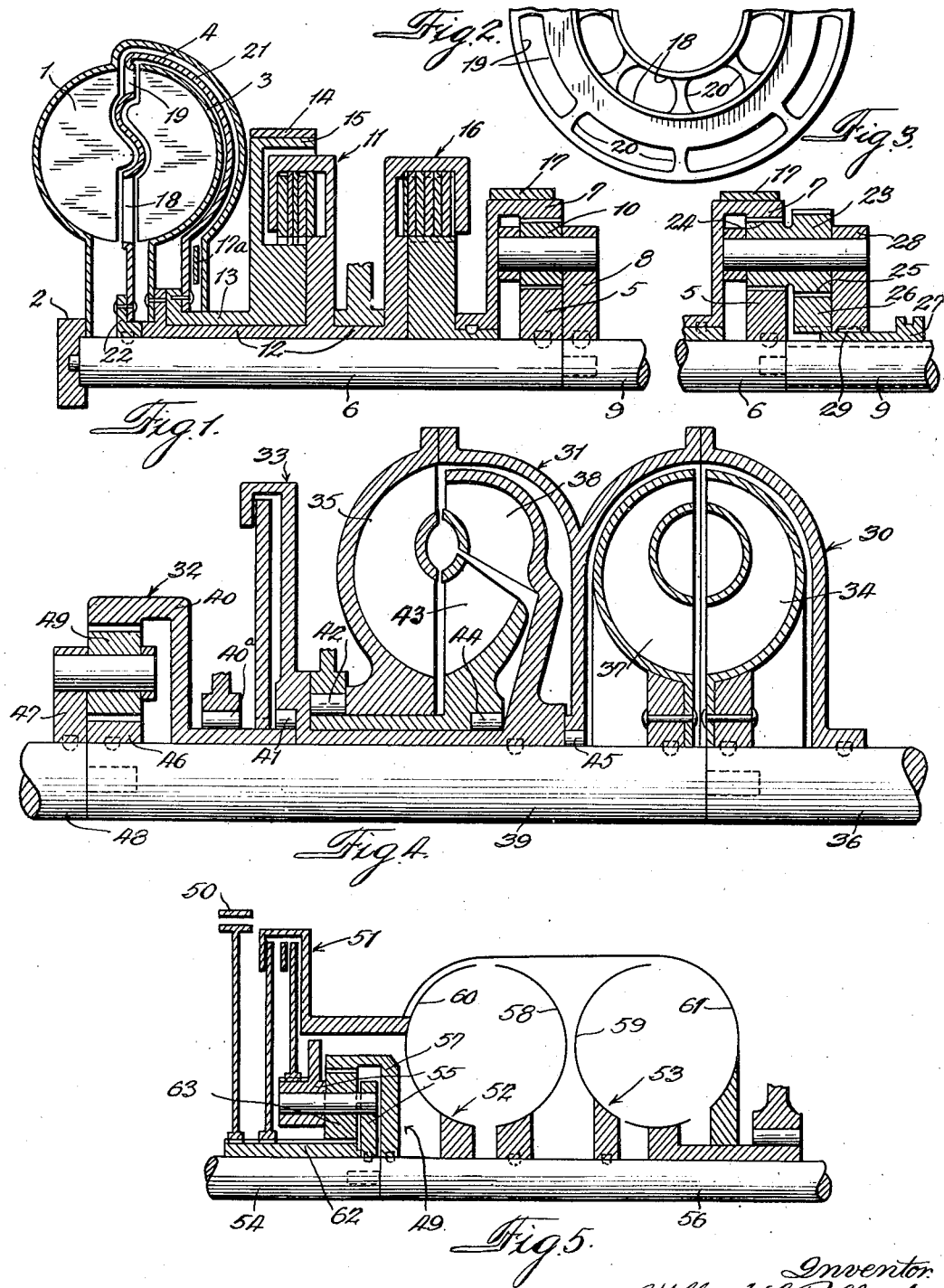
Inventor
Willard L. Pollard
By Thiess, Olsen & Mecklenburger
Attys.

Patented June 22, 1943

2,322,251

UNITED STATES PATENT OFFICE 2,322,251

VARIABLE SPEED TRANSMISSION

Willard L. Pollard, Evanston, Ill.

Application September 15, 1941, Serial No. 410,815

4 Claims. (Cl. 74—189.5)

My invention relates to variable speed transmissions.

One of the objects of my invention is to provide a simple, inexpensive and effective form of three-speed hydraulic transmission.

Further objects and advantages of the invention will be apparent from the description and claims.

In the drawing, in which several forms of my invention are shown,

Figure 1 is an axial sectional view showing a combination of hydraulic coupler and planetary;

Fig. 2 is an elevational view of the baffle or flow controller shown in Fig. 1;

Fig. 3 is an axial sectional view showing a planetary construction which may be substituted for that shown in Fig. 1;

Fig. 4 is an axial sectional view showing a combination of hydraulic coupler, hydraulic torque converter and planetary; and Fig. 5 is an axial sectional view showing another form of hydraulic coupler, hydraulic torque converter and planetary.

Referring to the drawing in detail, and first to Figs. 1, 2, and 3, the construction shown comprises a hydraulic coupler including a pump rotor 1, rotatable with a drive rotor 2, a turbine rotor 3, and a flow-separation and torque-transmitting rotor 4, a planetary construction including a sun gear 5 keyed to rotate with the shaft 6 to which the flow-separating rotod 4 is keyed, a ring gear 7, a gear carrier 8 keyed to rotate with the driven shaft 9 and planetary shaft 9 and planetary gearing 10 meshing with the sun gear 5 and ring gear 7, a multiple disc clutch 11 for connecting and disconnecting the hollow shaft 12 on which the turbine rotor 3 is carried with the hollow shaft 13 on which the outer shell of the flow-separating rotor 4 is keyed, a brake 14 for holding the drum 15 of the clutch against rotation when desired, a clutch 16 for connecting and disconnecting the ring gear 7 with respect to the hollow shaft 12 of the turbine rotor, and a brake 17 for holding the ring gear 7 against rotation when desired. The flow-separating rotor 4 is substantially open along an inner zone 18 opposite the inner ends of the blades of the pump and turbine rotors and is also open along an outer zone 19 opposite the outer ends of the blades of the pump rotor and turbine rotor, narrow spokes 20, however, being provided for bridging across these zones for transmitting torque from the outer shell 21 of the rotor to the hub 22 secured to the shaft 6. Any suitable control means may be provided for controlling the operation of the clutches 11 and 16 and brakes 14 and 17.

For low speed, the brake 17 is applied to hold the ring gear 7 against rotation, the clutch 16 is disconnected to free the ring gear from the turbine rotor, the brake 14 is released, and the clutch 11 is operated to connect the turbine rotor 3 with the torque-transmitting flow-separation rotor 4, and hence with the sun gear 5 through the shaft. With this arrangement, the ring gear 7 is held and power flows from the pump rotor 1 through the passages in the flow control rotor 4 to the turbine rotor 3, through the sleeve 12, clutch 11, clutch sleeve 13, torque-transmitting rotor 4 and shaft 6 to the sun gear 5.

For second speed, the brake 14 is applied to hold the sun gear 5 against rotation, the clutch 11 is released, the brake 17 is released, and the clutch 16 is applied to connect the ring gear 7 with the sleeve 12 on which the turbine rotor 3 is mounted. Under these conditions, the sun gear 5 is held against rotation by the brake 14 which holds the brake drum 15, the torque-transmitting rotor 4, the shaft 6, and sun gear 5 against rotation, and the ring gear 7 rotates with the turbine rotor 3, the power flow being from the turbine rotor 3 through the sleeve 12 and clutch 16 to the ring gear 7. For substantially direct drive, both brakes 14 and 17 are released, and both clutches 11 and 16 are applied, thus connecting both the sun gear 5 and ring gear 7 with the turbine rotor 3.

It is obvious that one-way anchorage devices may be substituted for either or both of the brakes 14 and 17 with consequent free wheeling action. A clutch plate 17a rotatable with the clutch sleeve 13 and engageable and disengageable with respect to the casing of the drive rotor 1 may be provided enabling the sun gear to be connected to rotate as a unit with the drive rotor 1 to by-pass part of the power around the ring gear 7.

In Fig. 3 is shown a planetary unit which may be substituted for the planetary unit shown in Fig. 1 and which enables a satisfactory reverse to be obtained. In this form, the sun gear 5, ring gear 7, brake 17, and shaft 6 may be the same as in Fig. 1. In place, however, of the planetary gearing 10 shown in Fig. 1, a duplex planetary gearing 23 may be substituted, having one gear portion 24 which operates just as the gearing 10 shown in Fig. 1 operates but having an additional gear portion 25 of somewhat larger diameter than the gear portion 24 which meshes with sun gear 26. By means of a suitable dog clutch 27, the driven shaft 9 may be connected so as to rotate either with the gear carrier 28 or with the sun gear 26. When connected to rotate with the gear carrier 28, the operation is just as described in connection with Fig. 1. When, however, the clutch sleeve 27 splined on the driven shaft 9 is shifted forwardly so that its dog clutch teeth 29 will engage the sun gear 26 instead of the gear carrier 28, then, if the clutches and brakes are arranged so as to hold the sun gear 5 against rotation and connect the ring gear 7 to rotate with the turbine rotor 3, the sun gear 26 will be rotated in a direction reverse to the rotation of the ring gear 7 but at a lower speed, which speed is determined by the relative pitch diameters of the two gear portions 24 and 25 of the duplex gear.

The construction shown in Fig. 4 comprises a hydraulic coupler 30, a hydraulic torque converter 31, a planetary gear construction 32, and a clutch construction 33. The pump rotor 34 of the hydraulic coupler and the pump rotor 35 of the hydraulic torque converter are both secured to rotate with the drive shaft 36. The turbine rotor 37 of the coupler and the turbine rotor 38 of the converter are both keyed to rotate with an intermediate shaft 39. The ring gear 40 may be connected and disconnected with respect to the shaft 39 on which the turbine rotors 37 and 38 are keyed by means of the clutch 33. A one-way anchorage device 40a is provided to prevent reverse rotation of the ring gear 32 when the clutch 33 is disconnected. A one-way clutch 41 is provided to prevent the ring gear 40 from overrunning the turbine rotor 38. A one-way anchorage device 42 is provided to prevent reverse rotation of the reaction stato rotor 43. A one-way clutch 44 is provided to prevent the stato rotor 43 from overrunning the turbine rotor 38. A one-way clutch 45 may be provided to prevent the intermediate shaft 39 from overrunning the drive shaft 36.

The planetary gear construction comprises a sun gear 46 keyed to the intermediate shaft 39, the ring gear 40, a gear carrier 47 keyed to the driven shaft 48, and planetary gearing 49 mounted on the gear carrier 47 and meshing with the sun gear 46 and ring gear 40. This planetary may be the same as that shown in Fig. 1. If desired, the planetary gear construction shown in Fig. 3 may be substituted for that shown in Fig. 4. In operation, power is transmitted from the drive shaft 36 to the intermediate shaft 39 in parallel, one branch being through the hydraulic coupler 30 to the intermediate shaft and the other being through the hydraulic torque converter 31 to the intermediate shaft. With this construction, torque will be increased in the branch through the torque converter 31, but torque will not be increased in the branch through the coupler 30. When the ratio of torque resistance in the intermediate shaft 39 to torque exerted by the pump rotor 35 reaches a certain value, the stato rotor 43 will begin to rotate and the hydraulic torque converter will then function as a hydraulic coupler. In general, a hydraulic torque converter does not act with great efficiency as a hydraulic coupler. However, the coupling action after the transformation takes place is aided by the efficient action of the hydraulic coupler 30 in parallel with the transformed converter.

For high torque resistance of the driven shaft, the clutch 33 is disconnected and the ring gear 40 is held against reverse rotation by the one-way anchor 40a. Under these conditions, the torque transmitted to the intermediate shaft 39 from the hydraulic coupler 30 and hydraulic torque converter 31 is all transmitted to the sun gear 46, and this torque is again multiplied in the shaft 48 by the planetary transmission 32.

For a lower torque, the clutch 33 is connected and both ring gear 40 and sun gear 46 are then direct connected to the intermediate shaft 39 so that the whole planetary turns as a unit and the driven shaft 48 rotates in unison with the intermediate shaft 39.

The construction shown in Fig. 5 comprises a planetary gear construction 49, a brake 50, a two-way clutch 51, a hydraulic coupler 52, and a hydraulic torque converter 53. The drive shaft 54 is connected to rotate with the gear carrier 55 of the planetary. The driven shaft 56 is connected to rotate with the ring gear 57, the turbine rotor 58 of the hydraulic coupler, and the turbine rotor 59 of the hydraulic torque converter. The pump rotor 60 of the hydraulic coupler is connected to rotate with the pump rotor 61 of the torque converter. The pump rotor 61 of the hydraulic torque converter can be coupled alternatively either with the gear carrier 55 of the planetary or with the sun gear of the planetary. The brake 50 may be applied to hold the sun gear against rotation when desired to effect overdrive.

In operation, for high torque in the driven shaft 56, the clutch 51 is operated to connect the gear carrier 55 of the planetary with the pump rotors 60 and 61 of the coupler 52 and torque converter 53. Under these conditions, power flows in two parallel paths from the gear carrier 55 of the planetary to the driven shaft 56, one path being through the hydraulic coupler 52 and the other path being through the hydraulic torque converter 53, the operation and effect of this connection being substantially as described in connection with Fig. 4 for divided power flow. For lower torque in the driven shaft 56, the pump rotors 60 and 61 of the coupler 52 and torque converter 53 are disconnected from the gear carrier 55 and connected with the sun gear 62. Under these conditions, there is a three-way power path from the gear carrier 55 to the driven shaft 56. One path is from the gear carrier 55 through the planet gearing 63 and ring gear 57 which is keyed to the driven shaft 56. Another path is from the gear carrier 55 through the planet gearing 63 and clutch 51 to the pump rotor of the hydraulic coupler and thence to the turbine rotor 58 of the coupler which is keyed to the driven shaft 56. The third path is from the gear carrier 55 through the planet gearing 63, sun gear 62, clutch 51, and pump rotor 61 of the hydraulic coupler and to the turbine rotor 59 of the hydraulic converter which is keyed to the driven shaft 56.

An overdrive may be obtained by completely disconnecting the clutch 51 and applying the brake 50, thus effecting an all-gear overdrive, the ring gear 57 overrunning the gear carrier.

Further modifications will be apparent to those skilled in the art and it is desired, therefore, that the invention be limited only by the scope of the appended claims.

Having thus described my invention, what I claim and desire to secure by Letters Patent is:

1. A hydraulic gear construction comprising a rotary drive member, a liquid torque transmitter including a vaned drive rotor driven from said drive member and a vaned driven rotor driven from said vaned drive rotor, a liquid transmitting torque-transmitting rotor extending across the space between said vaned rotors, a first gear means driven from said driven vaned rotor, a second gear means driven from said liquid-transmitting rotor, means for placing said liquid-transmitting rotor into and out of driven relation with respect to said rotary drive member, and means for holding it against rotation in at least one direction when not in said driven relation.

2. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid transmitting rotor, means for placing said liquid-transmitting rotor into and out of driven relation with respect to said rotary drive member, means for holding it against rotation in at least one direction when not in said driven relation, and a third gear means driven from both said first and second gear means.

3. A hydraulic gear construction comprising a rotary drive member, a liquid torque transmitter including a vaned drive rotor driven from said drive member and a vaned driven rotor driven from said vaned drive rotor, a liquid-transmitting torque-transmitting rotor extending across the space between said vaned rotors, a first gear means driven from said driven vaned rotor, a second gear means driven from said liquid-transmitting rotor, means for placing said liquid-transmitting rotor into and out of driven relation with respect to said rotary drive member, means for holding it against rotation in at least one direction when not in said driven relation, means for freeing said first gear means from driven relation with respect to said driven vaned rotor, and means for holding said first gear means against rotation in at least one direction when not in said driven relation.

4. A hydraulic planetary transmission comprising rotary drive means, pump rotor means driven by said drive means, turbine rotor means driven by said pump rotor means, a gear carrier, planet gearing carried by said gear carrier, a first gear meshing with said planet gearing, a second gear meshing with said planet gearing, means for connecting said first gear in driven relation to said turbine rotor means and for disconnecting it therefrom, anchorage means for holding said first gear against reverse rotation with respect to the direction of rotation of said turbine rotor means when disconnected therefrom, means for connecting said second gear for rotation in driven relation to said drive means and for disconnecting it therefrom, and anchorage means for holding said second gear against reverse rotation with respect to the direction of rotation of said drive means when disconnected therefrom.

WILLARD L. POLLARD.

CERTIFICATE OF CORRECTION.

Patent No. 2,322,251.  June 22, 1943.

WILLARD L. POLLARD.

It is hereby certified that error appears in the printed specification of the above numbered patent requiring correction as follows: Page 1, first column, line 31, for "rotod" read --rotor--; line 33, strike out "and planetary shaft 9"; and that the said Letters Patent should be read with this correction therein that the same may conform to the record of the case in the Patent Office.

Signed and sealed this 10th day of August, A. D. 1943.

Henry Van Arsdale,
(Seal). Acting Commissioner of Patents.